United States Patent [19]

Rosini et al.

[11] Patent Number: 4,638,465

[45] Date of Patent: Jan. 20, 1987

[54] INTEGRATED STRUCTURE MICROCOMPUTER PROVIDED WITH NON-VOLATILE RAM MEMORY

[75] Inventors: Paolo Rosini, Monza; Roberto Finaurini, Ancona; Maurizio Gaibotti, Barlassina, all of Italy

[73] Assignee: SGS-ATES Componenti Elettronici S.p.A., Catania, Italy

[21] Appl. No.: 575,686

[22] Filed: Jan. 31, 1984

[30] Foreign Application Priority Data

Aug. 4, 1983 [IT] Italy ............................ 22415 A/83

[51] Int. Cl.4 ............................................. G11C 00/00
[52] U.S. Cl. ..................................... 365/228; 365/226
[58] Field of Search ......................... 365/226, 228, 174

[56] References Cited

U.S. PATENT DOCUMENTS 3,980,935 9/1976 Worst .................................. 365/228

4,399,524 8/1983 Muguruma et al. ............ 365/228 X

Primary Examiner—Joseph A. Popek
Attorney, Agent, or Firm—Cushman, Darby & Cushman

[57] ABSTRACT

An integrated structure composed of a processing unit (CPU), ROM memory, RAM memory and other optional functions, such as input/output etc., is arranged as a microcomputer, in which all or part of the RAM is a non-volatile memory which carries out during normal operation all the functions of a RAM while also being able, through suitable circuit structures, to store in a permanent (non-volatile) way the data contained therein, retaining the data when the power feed to the circuit is cut off, and recalling the same data at power turn-on.

The structure provides for the handling of the non-volatile memory in its different functions, and its arrangement and compatibility with the processing unit, through suitable circuitry and control signals.

7 Claims, 3 Drawing Figures

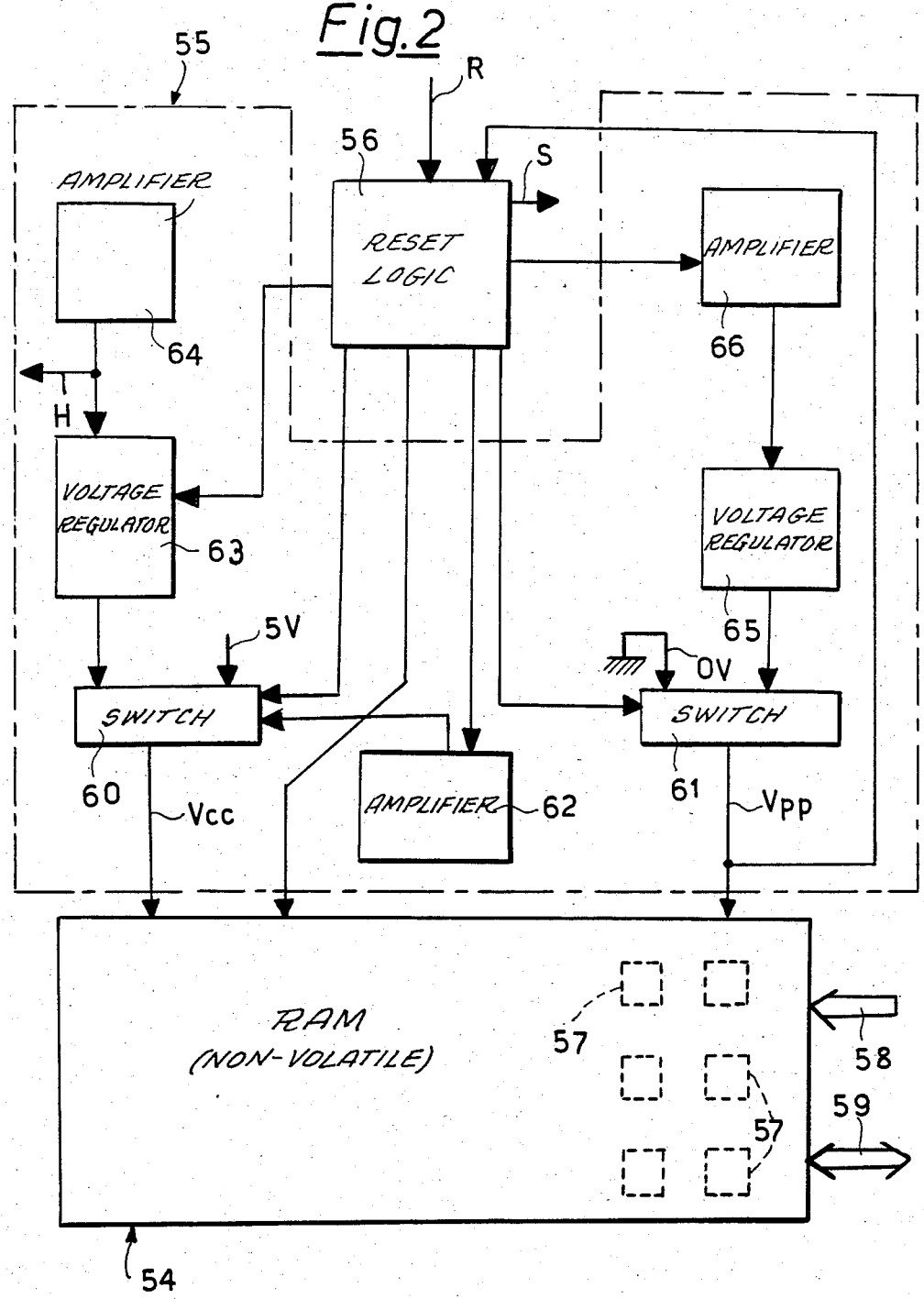

INTEGRATED STRUCTURE MICROCOMPUTER PROVIDED WITH NON-VOLATILE RAM MEMORY

BACKGROUND OF THE INVENTION

The present invention relates to an integrated structure microcomputer provided with a non-volatile RAM memory.

Integrated microcomputers usually comprise a central processing unit (CPU), a read-only memory (ROM), a random access memory (RAM) and several other more or less optional functions, such as input/output etc.

For some applications in which a microcomputer is used as a processing and/or control unit, it is necessary to retain some stored information when, for different reasons or necessities, the power supply is cut off.

For this purpose, there have recently been inserted inside microcomputers some non-volatile memory elements, so called EEPROM (electrically erasable programmable read-only memory), which are dedicated to the storage of the information which must be kept.

However, the use of non-volatile memories of the EEPROM type imposes some important limitations.

(a) Every time one wants to store new data, it is necessary that the microcomputer executes a particular sequence of operations to cause the storage. Such operations require a certain execution time (typically, about 10 ms), which limits the microcomputer's speed. Therefore, the microcomputer is obliged to slow the execution of its instruction program, and it is possible to store in a given time only a limited quantity of information.

(b) As non-volatile memory cells can support only a limited number of modifying cycles of their electric state (for example 10,000 cycles), the storage of data in such memory cells, if effected during the normal execution of the program (that is, before the necessity for non-volatile storage due to power cut-off), causes useless ageing of the memory.

(c) On the other hand, if the information processed by the microcomputer is stored in the non-volatile memory only at the moment of power turn-off so as to avoid any speed reduction of the microcomputer during the normal operation and to limit the ageing of the memory cells by modifying their electric state only when it is necessary to save the information, then it is necessary to detect the power drop and to support the voltage level, by means of capacitive elements for the time necessary for storage, that is, for a time which is longer as the quantity of information to be stored is greater and for which greater cost and complexity of the feed circuitry is required. Furthermore, it is also always necessary in such a case to include in the program a special operations sequence.

SUMMARY OF THE INVENTION

The object of the present invention is to realize an integrated structure microcomputer in which suitable non-volatile memory elements make possible the storage of information in case of power turn-off (or of a corresponding signal of different origin) without the above mentioned drawbacks of present techniques.

According to the invention, this object is realized by means of an integrated structure microcomputer, characterized in that, in partial or total substitution for the usual RAM, said integrated structure includes a non-volatile RAM memory provided with control and voltage amplification circuitry, said non-volatile RAM being formed by a matrix of non-volatile RAM cells automatically available for storage condition at the moment of power turn-off (or of the sending of corresponding signal).

The addition of the non-volatile RAM memory with an automatic response to power turn-off keeps the microcomputer in its normal physical structure and permits the normal development of programs, while also avoiding cycle slowdowns and the phenomenon of early ageing of the non-volatile cells. At the same time, such an arrangement allows an immediate and automatic storage of data when necessary. Everything remains substantially unaltered, while providing the capability of retaining the information in case of power turn-off (or any other event with similar effect).

DETAILED DESCRIPTION OF THE INVENTION

The features of the present invention will be made more evident by the following detailed description of the embodiment illustrated, by way of a non-limitative example, in the enclosed drawings, wherein:

FIG. 2 shows in block diagram form details of both the non-volatile RAM memory included in the FIG. 1 microcomputer and the relative control and voltage multiplication circuits therefore;

Figure 1:
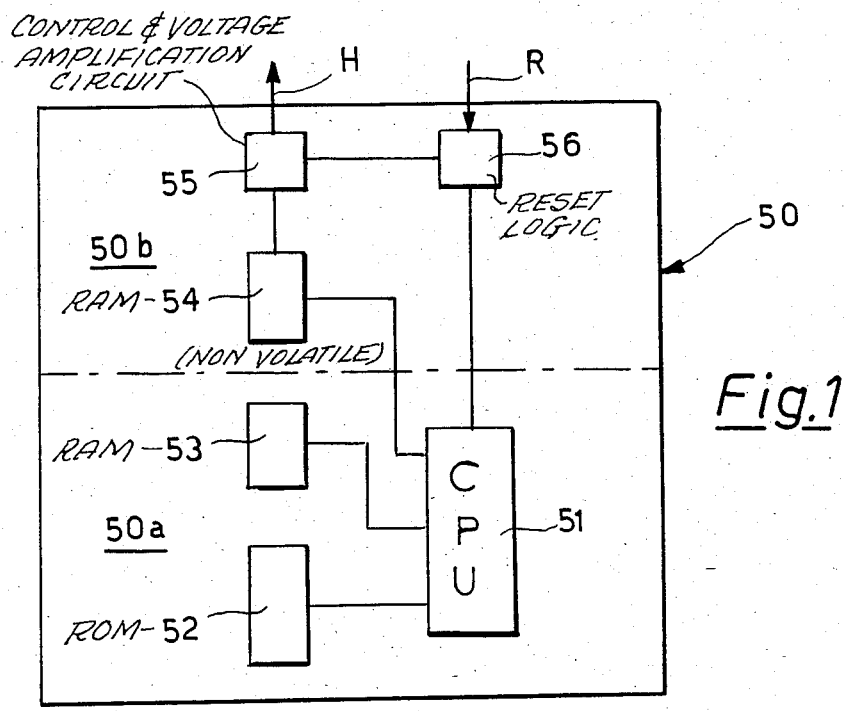
FIG. 1 represents a block diagram of a microcomputer according to the invention.

With reference to FIG. 1, inside a monolithic integrated structure 50, which symbolically is divided into two parts 50a and 50b in order to identify respectively the prior art and the present innovation, the essential parts of the microcomputer according to the invention are shown.

Part 50a comprises a central processing unit (CPU) 51, a read-only memory (ROM) 52 and a random access memory (RAM) 53, as well as other conventional circuits which need not be described in details herein.

According to the invention, joined to the prior art devices contained in part 50a, is what is found in part 50b, that is, a non-volatile RAM memory 54 with annexed circuits of control and voltage amplification 55 from which is obtained a high voltage H which can be used to charge a capacitive element to temporarily retain a voltage level in case of power turn-off. A reset logic circuit 56 controlled by an input signal R is associated with circuits 55 and CPU 51 in order to cause their actuation, in response to signal R at the moment of the power turn-off and turn-on. The reset logic circuit 56 is a conventional device, such as a flip-flop, which is responsive to signal R communicating power turn-off, or simulating such an occurrence. When signal R is applied, the reset logic circuit controls switches 60 and 61 (FIG. 2) to change the supply voltages $V_{cc}$ and $V_{pp}$ for the non-volatile RAM memory 54, as now will be described.

Details of the devices constituting the non-volatile RAM 54, the multiplication and control circuits 55 and the reset logic 56 are illustrated in FIG. 2, wherein the RAM 54, while still illustrated in general terms, is shown as being composed of a matrix of non-volatile RAM cells 57, to which the CPU 51 sends address signals and sends (or picks up) data signals through respective lines contained in so called "busses" 58 and 59. An illustrative embodiment of a cell 57 will be described hereinafter with reference to FIG. 3.

The multiplication and control circuits 55 comprise two switches 60 and 61, which in normal operating conditions pass to the cells 57 of the memory 54 feed voltages $V_{cc}$ and $V_{pp}$, respectively at 5 V and 20 V, for the normal operation of these cells as RAM memory elements of the bistable kind. Under the control of the logic 56 said switches are, however, able to modify these voltages, bringing them respectively to 20 V and 0 V for the storage of data in cells 57 at the moment of power turn-off. In order to form the desired value of $V_{cc}$, the switch 60 cooperates with a voltage amplifier 62 controlled by the logic 56 and with a voltage regulator and increasing rate limiter 63 which in turn is supplied by a voltage amplifier 64 (from which the signal H also is obtained) and controlled by the logic 56. The switch 61 cooperates with a voltage regulator 65 fed by a voltage amplifier 66 controlled by the logic 56. The latter in turn is controlled by the voltage $V_{pp}$ and it makes available a signal S for the CPU 51.

Figure 3:
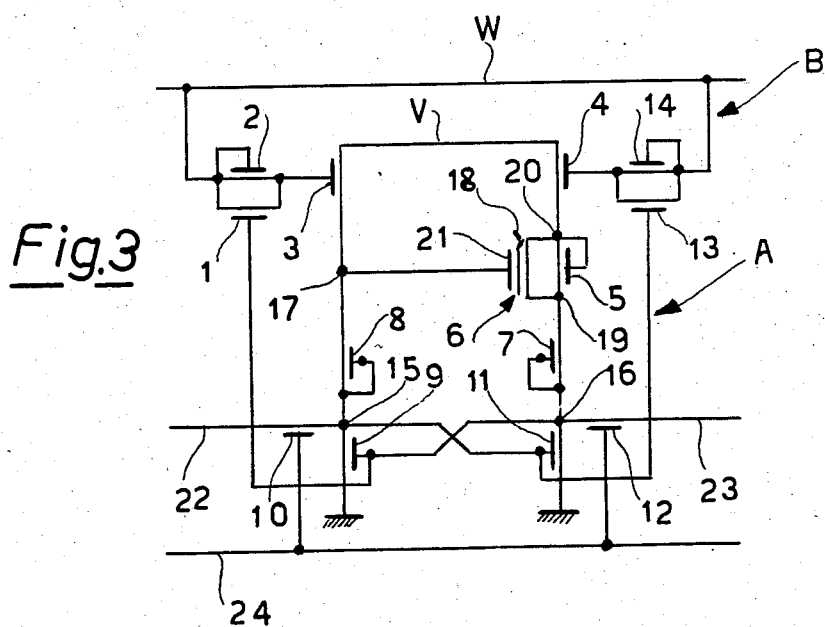
FIG. 3 is a schematic diagram illustrating circuit details of an example of a non-volatile memory cell.

As already stated, the memory RAM 54 comprises by a matrix of non-volatile cells 57. These are illustrated in FIG. 3 and are of the kind described in detail in the copending Italian patent application No. 22256 A/83 filed on July 27, 1983, on which priority is based for U.S. application Ser. No. 572,453, filed on Jan. 20, 1984, now U.S. Pat. No. 4,609,999, whose Assignee is the same as the present application. A general description of cells 57 now will be given. For greater details, reference is made to the above mentioned applications.

With reference to FIG. 3, there is illustrated a RAM memory cell of non-volatile kind, realized with metal-oxide-semiconductor (MOS) technology. Its circuit is substantially composed by two parts A and B, the first one of which defines a bistable circuit with a non-volatile memory element and the second one is intended for the commutation from the condition of normal bistable operation (that is as a static RAM) to that of storage of information relative to the state of the bistable circuit (also called "programming" of the non-volatile element) and then also to that of restoration of the stored information.

The bistable circuit, that is the part A, comprises as usual two interconnected circuit branches, which develop between a supply line V (controlled by the switch 60 of FIG. 2) and ground. One of the branches includes a series of transistors 3, 8 and 9, the second transistor being of the "depletion" kind constituting one of the load transistors of the bistable circuit, while the third transistor constitutes one of the driver transistors of the same circuit. The transistor 3 on the other hand operates as a control transistor in the programming step, as it will be explained later on. The other branch of the bistable circuit includes in turn a series of transistors 4, 5, 7 and 11, the first, the third and the fourth one of which respectively correspond to the transistors 3, 8 and 9 of the other branch, with an interconnection of bistable kind being realized by crossed connections between the gate of transistor 9 and a circuit node 16 interposed between the transistors 7 and 11 of the other branch, and between the gate of the transistor 11 and a circuit node 15 interposed between the transistors 8 and 9 of the opposite branch. It is to be noted, however, that the length of the transistor 7 is about half of that of the transistor 8, so that transistor 7 is inclined to set in its own branch a current of double value relative to that of the other branch. Furthermore, the transistor 11 is longer than the transistor 9, so with equal "gate" voltage and "drain" current it will have a "drain" voltage higher than that of the transistor 9. This assymetry does not disturb the working of the bistable circuit, but influences the positioning of the same at the moment of the turn on, as it will be explained hereinafter.

The transistor 5, of the "enhancement" kind, has connected at its "drain" node 20 and "source" node 19 an electrically programmable non-volatile memory element 6, which is illustrated by way of example as being the kind with a "floating gate" 18 and a "programming gate" 21 connected to an intermediate node 17 between the transistors 3 and 8 of the opposite circuit branch. More precisely, the non-volatile memory element 6 can be considered as constituted, by way of example, by a transistor of the kind illustrated in U.S. Pat. No. 4,203,158, which discloses the presence of a very thin layer (100 Å) of silicon oxide interposed between the "drain" 20 and the "floating gate" 18 and having the capacity of becoming conductive and then charging (positively or negatively) the "floating gate" 18 when submitted to an electric field of suitable intensity (Fowler-Nordheim effect). The charge of the "floating gate" 18 is dependent on the other hand, on whether the non-volatile element 6 is more of less able to short-circuit the transistor 5, with the effects which will be explained later on. When not short-circuited, the transistor 5 does not influence with its voltage drop, the bistable operation. Instead, it only lowers the high voltage level (logic level "one") present at the node 16.

The commutation controls are given to the bistable circuit by "bit lines" 22 and 23 (connected to the "bus" 59 of FIG. 2) through respective transistors 10 and 12 with "gates" controlled by a "word line" 24.

The part B, or programming or precharge part of the RAM cell shown in FIG. 3, includes two pairs of parallel connected transistors 1-2 and 13-14 interposed between the "gates" of the transistors 3 and 4 and a programming or precharge line W controlled by the switch 61 of FIG. 2. The "gates" of the transistors 1 and 13 are connected respectively to the "gates" of the "driver" transistors 9 and 11 of the bistable circuit. The transistors 2 and 14 are of the "enhancement" kind and have their "gates" connected to their respective "drain" electrodes.

The node operation of the non-volatile RAM cell of FIG. 3 (and consequently in general of the non-volatile RAM memory 54 of FIG. 2 and of the microcomputer of FIG. 1 which includes it) is described as follows.

During conditions of normal operation of the microcomputer, the logic 56 allows the switch 61 to apply to the line W of each of the cells 57 a voltage $V_{pp}=20$ V, which is transferred to the gates of the transistors 3 and 4 with a drop of about 2 V due to the transistors 2 and 14 (which are of the "enhancement" kind). The resulting voltage of 18 V makes the transistors 3 and 4 extremely conductive such that they practically act nearly as shortcircuits, connecting to line V (kept at 5 V by the switch 60 of FIG. 2 with the aid of the voltage amplifier 62, which transfers of the 5 V to cells 57) the electrodes 21 and 20 of the non-volatile transistor 6. When so conditioned, the circuit operates as a normal bistable circuit, without being influenced, as already indicated, by the presence of the transistor 5.

An occurrence of the signal R, either due to a power turn-off or after a control of the same kind, the following operating mode causes storage of information corresponding to the state of the bistable circuit. This constitutes the so called "programming" of the non-volatile memory element 6.

The fall of the line power, communicated as signal R, causes, through the logic 56 and the switches 60 and 61 of FIG. 2, a corresponding fall to 0 V of the voltage $V_{pp}$ on the line W and, immediately thereafter, a momentaneous and progressive increase of the voltage $V_{cc}$ on line V from 5 V to 20 V. More particularly, the switch 61 turns to 0 V, when the block 66 is disabled. The logic 56 detects when the commutation has occured and controls the switch 60 to respond to the influence of blocks 64, 63 in order to transfer the voltage of 20 V produced by block 64, and adjusted by the block 63, to the cells 57. During this step, the block 63 adjusts the increase of $V_{cc}$ from 5 V to 20 V so as to make it gradual whereby the non-volatile elements 6 of the cells 57 are not damaged.

Depending on which state the bistable circuit is in (that is, with branch 7-11 non-conducting whereby the node 16 is at high level and with the branch 8-9 in conduction whereby the node 15 at low level, or viceversa), one of the transistors 1-13 has its gate biased at high level and while the other has its gate biased at low level, whereby one is conducting and the other one is non-conducting. Accordingly, one of the transistors 3-4 has its gate connected to ground (voltage 0 V of the line W) through the conducting one of the two transistors 1-13, and therefore is non-conducting, while the other transistor substantially retains its gate charge (thanks to the gate capacity of the transistor and to the diffusion capacity associated to the relative circuit node) whereby it conducts. The transistors 2 and 14 do not influence this behaviour, as they have a gate-source voltage equal to 0 and operate as reverse diodes. Both branches 3-8-9 and 4-7-11 are therefore interdicted and consequently no current absorption occurs from line V, now at about 20 V.

In this condition, the programming operation of the non-volatile memory element 6 occurs as follows.

If at the moment of the power supply turn-off the bistable circuit is in the state with the branch 4-7-11 interdicted and the branch 3-8-9 in conduction, the programming gate 21 of the non-volatile element, connected to the node 17, is at ground potential, while the drain electrode 20 of the same non-volatile element rises with the potential of the line V thanks to the conduction assured transistor 4 by maintenance of the gate voltage of said transistor at a high value. As a result, if the floating gate of the non-volatile element 6 has been previously negatively charged, a current flows from 20 to 18, which positively charges the floating gate 18. If, on the other hand, gate 18 has already been positively charged, everything remains as before; that is, there is no passage of current. This is very important because it limits the ageing phenomenon of the non-volatile element which occurs every time the conductivity is changed with a consequent passage of charges through the thin oxide.

If at the moment of the power supply turn off the bistable circuit is in the state with the branch 4-7-11 in conduction and the branch 3-8-9 interdicted, the programming gate 21 of the non-volatile element 6 rises to the potential of line V through the transistor 3 (in such case in conduction), while the drain 20 of the same non-volatile element falls to ground potential through the transistors 7 and 11. As a consequence, the floating gate 18 negatively charges, if not already charged, by passage of current between gate 18 and the drain 20.

In summary, according to the state of the bistable circuit, the non-volatile element 6 puts a positive or negative charge on the floating gate 18 without current absorption and without a compulsory change of charge and conductivity (as it would happen, for example, if it was necessary to first annul of the previous charge condition).

At this point the non-volatile element 6, its related cell 57 and finally the RAM 54 and the microcomputer 50 have stored data relative to the previous taken state of the bistable circuit.

The charge condition assumed by the non-volatile element 6, that is on its programming, as a function of the state of the bistable circuit, is dependent on the other hand on the restoration of the same state at the moment of the power turn-on. If the charge on the floating gate 18 is positive, the non-volatile element 6 short-circuits the transistor 5, assuring the load transistor 7 a higher current which, by combining with the greater length (and consequently greater resistivity) of the transistor 11, causes the voltage level of the noe 16 to rise before that of the node 15. Consequently, the bistable circuit returns to the initial state with the branch 8-9 in conduction and the branch 7-11 interdicted. If, on the other hand, the charge stored in the programming step on the floating gate 18 is negative, the transistor 5 is not short-circuited by the non-volatile transistor 6. Instead, it is turned slight delay (necessary to allow the voltage to pass from the drain 20 to the source 19) allowing the voltage of the node 15 to rise more quickly than that of the node 16. The bistable circuit thus returns to the initial state with the branch 7-11 in conduction and the branch 8-9 interdicted.

From what has been stated it is easy to see that the microcomputer according to the invention, while it operates in completely normal way, according to the prefixed program and at maximum speed during the normal work of data processing, is able to automatically and immediately execute, without special program changes, data storage when power turn-off (or other event of analogous effect) occurs. It is also possible to store data after the power drop-off by using, in view of the nearly zero consumption of the non-volatile RAM cells 57, the charge stored in a condenser opportunely precharged with the voltage H. It is also to be noted that since a change in the charge of the non-volatile memory element 6 of the cells 57 is required only at the moment of data storage, and only when its previous state is different from that to which it is called, the ageing phenomenon is minimized.

At power turn-on, on the other hand, all the cells 57 return to their previous state of storage.

What is claimed:

1. An integrated structure microcomputer, comprising:
    a non-volatile RAM memory; and
    voltage control circuitry joined to said memory, said circuitry being responsive to voltage changes on a supply line associated with said circuitry to alter a supply voltage applied by the circuitry to said memory, the memory including a matrix of non-volatile RAM cells responsive to changes in voltage supplied by the circuitry whereby data is stored in the cells, each of said cells comprising a bistable circuit with two interconnected branches, alternatively conducting and non-conducting, one of which includes a non-volatile memory element which can be electrically programmed in one or the other of two electric states as a function of the state in which said bistable circuit is at the moment of turn-off of power on said supply line and which also is able to cause the restoration of said state of the bistable circuit at the moment of power turn-on, each branch of said bistable circuit also including a control switch element controlled by the level of said power and by the state of the other branch of the bistable circuit whereby power turn-off allows the non-conducting branch of the bistable circuit to cause interdiction of the conducting branch of the same bistable circuit for consequent programming of said non-volatile memory element without current absorption.

2. A microcomputer according to claim 1, wherein said control switch element comprises a transistor inserted between a respective branch of said bistable circuit and a low-voltage line provisionally switchable to a higher voltage in response to a gate connected to a further line at higher voltage switchable to ground at the moment of power turn-off, said connection including a state sensing transistor having a gate voltage dependent on the state of said other branch of the bistable circuit.

3. A microcomputer according to claim 2, wherein said non-volatile memory is of the kind having a floating gate interposed between a programming gate connected to a circuit node situated in series with a branch of the bistable circuit and two drain and source electrodes of a short-circuitable transistor inserted in the other branch of the bistable circuit.

4. A microcomputer according to claim 2, said voltage control circuitry includes respective switches controlled by a reset logic circuit responsive to a power turn-off condition.

5. A microcomputer according to claim 4, wherein each of said switches has associated therewith a voltage amplifier provided with a voltage regulator for the generation of the highest one of the voltages applied to each of said lines.

6. A microcomputer according to claim 5, wherein the voltage regulator has associated therewith a voltage increase limiter for adjusting an increase in time from said low voltage to said highest voltage in response to power turn-off.

7. A microcomputer according to claim 1 wherein said voltage control circuitry produces a high-voltage signal for charging a capacitive element to maintain power voltage level for a predetermined time after power turn-off.

* * * * *